3,089,865
PROCESS FOR POLYMERIZING VINYL COMPOUNDS WITH UNSYMMETRICAL HALOGEN-SUBSTITUTED DIACYL PEROXIDES
Richard A. Walther and Howard M. Rife, Charleston, W. Va., assignors to Union Carbide Corporation, a corporation of New York
No Drawing. Filed Jan. 7, 1958, Ser. No. 707,477
8 Claims. (Cl. 260—87.1)

This invention relates to the polymerization of vinyl compounds. More particularly it pertains to the polymerization of vinyl compounds in the presence of unsymmetrical halogen substituted diacyl peroxides.

The use of diacyl peroxides and symmetrical bis halogen-substituted diacyl peroxides as catalysts for the polymerization of vinyl compounds has long been known. The diacyl peroxides have not been completely satisfactory since they favor the formation of hard, ivory-like deposits on the walls of the polymerization equipment, and also because they are generally carried over with the monomer into the recovery system where they cause unwanted polymerization of the unreacted and recovered monomers. While the symmetrical bis halogen-substituted diacyl peroxides are more active and less volatile than the corresponding non-halogen substituted diacyl peroxides, they generally lack thermal stability, and at the polymerization temperatures ordinarily employed the high rate of decomposition of these peroxides results in a rapid decrease in the rate of polymerization.

It has now been found that the unsymmetrical halogen-substituted diacyl peroxides have improved catalytic properties than the diacyl peroxides or the bis halogen-substituted diacyl peroxides in the bulk polymerization of vinyl compounds. These peroxides can be broadly represented by the general formula:

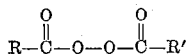

wherein R represents a hydrocarbon radical and R' represents an halogen substituted hydrocarbon radical.

In the above general formula for the preferred unsymmetrical halogen substituted diacyl peroxides R represents a hydrocarbon radical, such as an alkyl radical containing from 1 to about 10 carbon atoms, for example, methyl, ethyl, propyl, isopropyl, hexyl, octyl, and the like, a cycloaliphatic radical such as cyclopentyl, cyclohexyl, and the like, an aryl radical such as phenyl naphthyl, and the like; and R' represents an halogen-substituted hydrocarbon radical, such as an alkyl radical containing up to about 10 carbon atoms, a cycloaliphatic radical or an aryl radical, said halogen-substituted hydrocarbon radical containing from 1 to about 5 halogen substituents thereon.

Among the unsymmetrical halogen substituted diacyl peroxides that can be used as catalysts in this invention there may be mentioned acetyl dichloracetyl peroxide, acetyl trichloracetyl peroxide, propionyl dichloracetyl peroxide, propionyl trichloracetyl peroxide, valeryl dibromobutyryl peroxide, capryl trichlorovaleryl peroxide, propionyl tribromovaleryl peroxide, butyryl dichloracetyl peroxide, butyryl trichloracetyl peroxide, acetyl tetrachlorobutyryl peroxide, propionyl pentachlorovaleryl peroxide, acetyl dichlorophenyl peroxide, butyryl alpha-chloronaphthoyl peroxide, and the like.

The unsymmetrical halogen substituted diacyl peroxides suitable for use as catalysts in the process of this invention can be produced by reacting about equimolar quantities of two organic acid halides, one of which is halogen substituted, with an excess of sodium peroxide. For example, propionyl trichloracetyl peroxide can be obtained from equimolar amounts of propionyl chloride and trichloracetyl chloride by vigorously shaking at about −10° C., a dilute solution of the two acid chlorides in an inert organic solvent, such as heptane or ethylene dichloride, with an excess of aqueous sodium peroxide. The mixture is agitated for about one minute, the aqueous and organic solvent layers are allowed to separate and the organic peroxide/organic solvent layer is decanted from the aqueous layer, which contains unreacted sodium peroxide, hydrolyzed acid chlorides and sodium chloride. The organic peroxide/organic solvent layer contains from about 4% to 7% by weight of organic peroxides, which consists of a mixture of propionyl chloracetyl peroxide, bispropionyl peroxide, and bis-chloracetyl peroxide. Because of the high reactivity and unknown explosion points of the unsymmetrical halogen substituted diacyl peroxides, no attempt was made to separate the gross peroxide product to ascertain the actual composition. Therefore, the term "unsymmetrical halogen substituted diacyl peroxide" as used in this specification refers to the mixture of peroxides obtained by the above described reaction rather than to the pure, isolated compound. tI is believed that the pure unsymmetrical halogen-substituted diacyl peroxides have greater activities than the mixtures herein used, though experimental data is not yet available.

The monomers which can be polymerized by the processes of this invention are the polymerizable organic compounds containing an ethylenic or vinyl linkage

Included in this class are the aryl substituted olefins, such as styrene, alphachlorostyrene, and the like; the acrylic and alpha-substituted acrylic acids, esters, nitriles and amides, such as acrylic acid, acrylonitrile, alphamethacrylonitrile, methyl acrylate, ethyl acrylate, methacrylamide, and the like; and the vinyl esters, ethers, ketones and heterocyclic vinyl compounds such as vinyl chloride, vinyl acetate, vinyl propionate, vinyl butyrate, and the like. These monomers, as well as mixtures of two or more of them, can be polymerized by the processes of this invention. However, best results have been obtained when vinyl chloride, or a mixture consisting predominantly of vinyl chloride with lesser proportions of other copolymerizable monomers such as vinyl bromide, vinylidene chloride, vinyl acetate, ethylene, methyl acrylate, methyl methacrylate, and the like, was polymerized with these peroxide catalysts.

The catalyst concentration used in the processes of this invention can be varied from about 0.005% up to about 3% by weight or higher, based on the weight of monomeric materials. The preferred range is from about 0.01% to about 0.5% by weight, and the unsymmetrical halogen-substituted peroxide can be used either as the purified products or as the gross reaction mixture as obtained from the peroxide production process.

The temperature at which the polymerization is carried out is not critical; it can be varied over a wide range of from about room temperature up to about 65° C. or higher. The preferred range, however, is from about 40° C. to about 50° C.

The unsymmetrical halogen-substituted diacyl peroxides are much more active catalysts in the bulk polymerization of vinyl monomers than are the bis-acyl peroxides. For example, propionyl trichloroacetyl peroxide and propionyl dichloroacetyl peroxide are about eight times as active as diacetyl peroxide, while acetyl trichloroacetyl peroxide is about 12 times as active. To illustrate this point more clearly, propionyl dichloroacetyl peroxide initiated polymerization of a vinyl chloride-vinyl acetate mixture in about 10 minutes at 5° C. while diacetyl peroxide required 40 minutes at 20° C.; in both instances the peroxide concentrations used were those required to give the same polymerization rate after the polymerization had started.

After the reaction has proceeded the desired period of time, the unreacted monomer is recovered to be re-used. It was found that recovered monomer did not tend to polymerize on standing, since the unsymmetrical halogen-substituted peroxide was not carried over with the monomer into the recovery system where it would cause unwanted polymerization.

The polymers produced by the processes of this invention had improved mill stability and color. The mill stability is a measure of the rate of color development when the resin is milled at 170° C. In this test the resin whiteness or color is measured by comparison of the initial color of the resin with the color of the milled resin relative to fresh magnesium oxide, as determined with a Beckman Model DU Spectrophotometer. Lower mill stability values indicate improved properties; higher whiteness index values also indicate improved properties.

In the polymerization process of this invention, unless otherwise noted, the laboratory examples were conducted in Pyrex glass bombs, which were 20.8 cm. long, and had an inside diameter of 1.8 cm. and a capacity of 50 ml. The total charge used in these polymerizations was about 30 grams of monomer. A typical polymerization was as follows:

One and one-half grams of water was added to a tared glass bomb and then, from a master solution, an aliquot containing the desired catalyst concentration was added, followed by 1.38 grams of cold vinyl acetate. The master solution of the catalyst was prepared by dissolving the unsymmetrical halogen-substituted diacyl peroxide in heptane. Finally, 30.2 grams of vinyl chloride at about −40° C. was added and about 3 grams was allowed to vaporize to purge the contents of the bomb of any air or other gases. The bomb was capped and allowed to warm to 5° C., the approximate time at which polymerization started was indicated by a clouding of the charge. The bomb was then inserted in a revolving rack suspended in a water bath maintained at 50° C. for polymerization to take place. After polymerization was completed, the resin was recovered by allowing the unreacted vinyl chloride to vaporize slowly from the bomb and the resin was removed and dried at 60° C. The results of a series of examples are tabulated below as examples 1 to 10.

| Example | 1 | 2 | 3 | 4 | 5 | 6 | 7 | 8 | 9 | 10 |
|---|---|---|---|---|---|---|---|---|---|---|
| Charge: | | | | | | | | | | |
| Peroxide | A | A | B | B | C | C | C | D | D | D |
| Conc., percent by wt | 0.01 | 0.03 | 0.01 | 0.03 | 0.01 | 0.03 | 0.1 | 0.01 | 0.03 | 0.03 |
| Ratio of vinyl chloride to vinyl acetate | 95/5 | 95/5 | 95/5 | 95/5 | 95/5 | 95/5 | 95/5 | 95/5 | 95/5 | 100/0 |
| Water, percent by wt | 5 | 5 | 5 | 5 | 5 | 5 | 5 | 5 | 5 | 5 |
| Polymerization: | | | | | | | | | | |
| Induction period, Min. at 5° C | 6 | 6 | 6 | 6 | 10 | 10 | 15 | 12 | 12 | 12 |
| Time, hr | 1 | 1 | 1 | 1 | 2 | 2 | 0.83 | 2 | 1 | 1 |
| Temp., ° C | 50 | 50 | 50 | 50 | 50 | 50 | 50 | 50 | 50 | 50 |
| Conversion rate, percent per hour | 1.8 | 6.1 | 4.3 | 14.1 | 3.3 | 10 | 71 | 5 | 10 | 10.3 |
| Conversion, percent | 1.8 | 6.1 | 4.3 | 14.1 | 6.6 | 20 | 59 | 2.5 | 10 | 10.3 |

A—Peroxide from acetyl chloride and dichloroacetyl chloride.
B—Peroxide from acetyl chloride and trichloroacetyl chloride.
C—Peroxide from propionyl chloride and dichloroacetyl chloride.
D—Peroxide from propionyl chloride and trichloroacetyl chloride.

Larger scale examples were performed in a 10 gallon, jacketed, stainless steel autoclave, which was equipped with an anchor type agitator. Water, a solution of the catalyst in vinyl acetate, and the vinyl chloride were added to the thoroughly purged autoclave in the order stated and a small amount of the vinyl chloride was permitted to vaporize to further purge the autoclave. The autoclave was sealed and the contents were heated to 46° C. with tempered water in the jacket. At the end of the polymerization reaction, the unreacted vinyl chloride was vented from the autoclave, and the resin was discharged from the bottom and dried at 60° C. The results are tabulated below as Examples 11 to 14. For purposes of comparing physical properties, experiments with diacetyl peroxide and bis-chloroacetyl peroxide are included as Examples 15 and 16, respectively.

| Example | 11 | 12 | 13 | 14 | 15 | 16 |
|---|---|---|---|---|---|---|
| Charge: | | | | | | |
| Peroxide | C | C | C | D | E | F |
| Conc., percent by wt | 0.008 | 0.012 | 0.013 | 0.013 | 0.1 | 0.035 |
| Ratio of vinyl chloride to vinyl acetate | 95/5 | 95/5 | 95/5 | 95/5 | 95/5 | 95/5 |
| Water, lb | 5 | 5 | 5 | 5 | 5 | 5 |
| Polymerization: | | | | | | |
| Time, hr | 7 | 6 | 8.3 | 5 | 7 | 5.5 |
| Temp., ° C | 45 | 45 | 46 | 46 | 46 | 46 |
| Conversion rate, percent per hr | 1.3 | 3.4 | 2.6 | 2.5 | 2.3 | 2.3 |
| Conversion, percent | 8.8 | 20.2 | 21.6 | 10 | 16 | 12.8 |
| Resin Properties: | | | | | | |
| Specific viscosity (ASTM-D-1243-54*) | 0.219 | 0.223 | 0.215 | 0.210 | 0.213 | 0.215 |
| Resin whiteness | 96 | 93 | 98 | 98 | 91 | 87 |
| Mill stability | 80 | 83 | 86 | 68 | 128 | 94 |

C—Peroxide from propionyl chloride and dichloroacetyl chloride.
D—Peroxide from propionyl chloride and trichloroacetyl chloride.
E—Diacetyl peroxide.
*Modified to the extent of using 0.2 gram of resin in 100 ml. nitrobenzene solution and measuring the viscosities at 20° C.
F—Bis-chloroacetyl peroxide.

The data in the table clearly indicates the improved properties of the resins produced by the processes of this invention wherein the unsymmetrical halogen substituted diacyl peroxides are used as polymerization catalysts.

What is claimed is:

1. The method which comprises polymerizing a mixture of polymerizable monomers comprising principally vinyl chloride in the presence of an unsymmetrical halogen-substituted diacyl peroxide selected from the group of peroxides represented by the general formula:

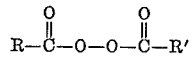

wherein R represents a member selected from the group consisting of hydrocarbon radicals selected from the group consisting of alkyl radicals containing from 1 to about 10 carbon atoms, cycloaliphatic radicals, and aryl radicals, and R' represents an halogen-substituted hydrocarbon radical selected from the group consisting of an alkyl radical containing up to about 10 carbon atoms, a cycloaliphatic radical, and an aryl radical; said halogen-substituted hydrocarbon radical containing from 1 to about 5 halogen substituents thereon selected from the group consisting of chlorine and bromine.

2. The method which comprises polymerizing a mixture of vinyl chloride as the principal polymerizable ingredient with at least one other polymerizable vinyl compound in the presence of an unsymmetrical halogen-substituted diacyl peroxide selected from the group of peroxides represented by the general formula:

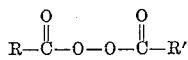

wherein R represents a hydrocarbon radical selected from the group consisting of alkyl radicals containing from 1 to about 10 carbon atoms, a cycloaliphatic radical, and an aryl radical, and R' represents an halogen-substituted hydrocarbon radical selected from the group consisting of an alkyl radical containing up to about 10 carbon atoms, a cycloaliphatic radical and an aryl radical; said halogen-substituted hydrocarbon radical containing from 1 to about 5 halogen substituents thereon selected from the group consisting of chlorine and bromine.

3. The method which comprises polymerizing a mixture of polymerizable monomers comprising principally vinyl chloride in the presence of propionyl dichloroacetyl peroxide as catalyst.

4. The method which comprises polymerizing a polymerizable monomeric mixture consisting predominantly of vinyl chloride in the presence of acetyl trichloroacetyl peroxide as catalyst.

5. The method which comprises polymerizing a polymerizable monomeric mixture consisting predominantly of vinyl chloride in the presence of butyryl trichloroacetyl peroxide as catalyst.

6. The method which comprises polymerizing vinyl chloride in the presence of propionyl trichloroacetyl peroxide as catalyst.

7. The method which comprises polymerizing vinyl chloride in the presence of acetyl dichloroacetyl peroxide as catalyst.

8. The method which comprises polymerizing a polymerizable monomeric mixture comprising vinyl chloride as the principal polymerizable ingredient and vinyl acetate in the presence of propionyl dichloroacetyl peroxide as catalyst.

References Cited in the file of this patent

UNITED STATES PATENTS

| | | |
|---|---|---|
| 2,366,306 | Alexander et al. | Jan. 2, 1945 |
| 2,403,758 | Rust et al. | July 9, 1946 |

FOREIGN PATENTS

| | | |
|---|---|---|
| 462,165 | Great Britain | Feb. 26, 1937 |